United States Patent
Itoh (10) Patent No.: US 8,979,416 B2
(45) Date of Patent: Mar. 17, 2015

(54) PANEL JOINT STRUCTURE

(75) Inventor: Daisuke Itoh, Toyota (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 0 days.

(21) Appl. No.: 13/814,206

(22) PCT Filed: Jan. 16, 2012

(86) PCT No.: PCT/JP2012/050724
§ 371 (c)(1),
(2), (4) Date: Feb. 4, 2013

(87) PCT Pub. No.: WO2013/108354
PCT Pub. Date: Jul. 25, 2013

(65) Prior Publication Data
US 2014/0016993 A1    Jan. 16, 2014

(51) Int. Cl.
*B23K 33/00* (2006.01)
*B32B 37/18* (2006.01)
*B23K 11/11* (2006.01)

(52) U.S. Cl.
CPC .............. *B32B 37/18* (2013.01); *B23K 11/115* (2013.01); *B23K 33/004* (2013.01); *B23K 2201/18* (2013.01)
USPC ....................................... 403/272; 228/173.6

(58) Field of Classification Search
CPC .............. B23K 11/115; B23K 33/004; B23K 2201/18; B32B 37/18; B29C 66/1122
USPC .......... 403/265, 268, 270, 271, 272; 228/164, 228/173.6, 175
See application file for complete search history.

(56) References Cited

U.S. PATENT DOCUMENTS

| 2,679,305 | A | * | 5/1954 | Gunthorp ...................... 403/270 |
| 3,197,855 | A | * | 8/1965 | Carter et al. .................. 228/107 |
| 3,526,954 | A | * | 9/1970 | Baehr et al. ................... 228/175 |
| 3,545,795 | A | * | 12/1970 | Heinrich et al. .............. 403/265 |
| 3,842,485 | A | * | 10/1974 | Bement ......................... 228/108 |
| 4,120,083 | A | * | 10/1978 | Echols |
| 5,006,385 | A | * | 4/1991 | Cheung et al. .................. 428/57 |
| 5,087,306 | A | * | 2/1992 | Cheung et al. |
| 5,476,210 | A | * | 12/1995 | Hodozuka et al. ............ 228/165 |
| 5,645,364 | A | * | 7/1997 | Hodozuka et al. ............ 403/270 |
| 5,979,742 | A | * | 11/1999 | Enomoto et al. ........... 228/112.1 |

(Continued)

FOREIGN PATENT DOCUMENTS

| DE | 3724648 | A1 | * | 2/1989 | ................. 228/173.6 |
| DE | 4310036 | A1 | * | 10/1994 | .................... 430/270 |

(Continued)

*Primary Examiner* — Michael P Ferguson
*Assistant Examiner* — Matthieu Setliff
(74) *Attorney, Agent, or Firm* — Kenyon & Kenyon LLP (57) ABSTRACT

In a panel joint structure, a first joint portion and first load transfer portions are formed on an end portion of a first panel, and a second joint portion and second load transfer portions are formed on an end portion of a second panel. A first joint surface of the first joint portion and a second joint surface of the second joint portion are welded and adhered to each other, and first load transfer surfaces of the first load transfer portions and second load transfer surfaces of the second load transfer portions are adhered to each other. The first load transfer surfaces are contained in the range of the plate thickness of a first panel body portion, and the second load transfer surfaces are contained in the range of the plate thickness of a second panel body portion.

3 Claims, 6 Drawing Sheets

(56) References Cited

U.S. PATENT DOCUMENTS

| | | | |
|---|---|---|---|
| 6,527,470 B2* | 3/2003 | Ezumi et al. | 403/270 |
| 7,090,111 B2* | 8/2006 | Egan et al. | 228/1.1 |
| 7,374,823 B2* | 5/2008 | Maruyama et al. | 428/544 |
| 2011/0101030 A1* | 5/2011 | Csaba et al. | |

FOREIGN PATENT DOCUMENTS

| | | |
|---|---|---|
| JP | 58-188583 A | 11/1983 |
| JP | 58-199675 A | 11/1983 |
| JP | 63-220981 A | 9/1988 |
| JP | 02-078541 A | 3/1990 |
| JP | 05-220846 A | 8/1993 |
| JP | 05-285669 A | 11/1993 |
| JP | 11-170059 A | 6/1999 |
| JP | 2000-334573 A | 12/2000 |
| JP | 2002-193080 A | 7/2002 |
| JP | 2004-082136 A | 3/2004 |
| JP | 2007-309470 A | 11/2007 |
| JP | 2008-000754 A | 1/2008 |
| JP | 2008-215423 A | 9/2008 |
| JP | 2009-000728 A | 1/2009 |
| JP | 2009-190051 A | 8/2009 |
| WO | WO 8702745 A1 * 5/1987 ................... 403/271 |

* cited by examiner

PANEL JOINT STRUCTURE

CROSS-REFERENCE TO RELATED APPLICATIONS

This application is a United States National Stage Patent Application filed under 35 U.S.C. § 371, based on International Application Serial No. PCT/JP2012/050724, which was filed on Jan. 16, 2012, the entire contents of which is expressly incorporated herein by reference.

TECHNICAL FIELD

The present invention relates to a panel joint structure equipped with a first panel that has a first joint portion and a second panel that has a second joint portion joined to the first joint portion.

BACKGROUND ART

Conventionally, as this type of panel joint structure, for example, the following structure has been known. That is, in patent document 1, there is described a structure where end portions of a pair of metal plates formed in strips are placed on top of each other and the end portions are joined to each other by welding and adhesion.

PRIOR ART DOCUMENTS

Patent Documents

Patent Document 1: Japanese Patent Application Laid-Open (JP-A) No. 11-170059
Patent Document 2: JP-A No. 58-199675

DISCLOSURE OF INVENTION

Technical Problem

However, in the structure described in patent document 1, when tensile forces act with respect to the pair of metal plates parallel to these metal plates, moments act on the end portions of the pair of metal plates and loads act between the end portions in the direction in which the end portions come apart from each other. In this case, there is the concern that the end portions will come apart from each other.

The present invention has been made in view of the above problem, and it is an object thereof to obtain a panel joint structure which, even in a case where tensile forces have acted with respect to a first panel and a second panel parallel to these panels, can suppress a first joint portion and a second joint portion from coming apart from each other.

Solution to Problem

In order to achieve the above object, a panel joint structure of the present invention includes: a first panel body portion that configures a body portion of a first panel; a first joint portion that is formed on an end portion of the first panel, is offset toward one side of the first joint portion in a plate thickness direction of the first panel with respect to the first panel body portion, and has a first joint surface that extends along a centerline that passes through a plate thickness direction center of the first panel body portion; a pair of first load transfer portions that are formed via bent portions on an end portion of the first joint portion at a first panel body portion side and an end portion of the first joint portion at an opposite side of the first panel body portion side and have first load transfer surfaces that are bent with respect to the first joint surface and are contained in a range of a plate thickness of the first panel body portion; a second panel body portion that is positioned on the opposite side of the first panel body portion side with respect to the end portion of the first panel, extends along the centerline, and configures a body portion of a second panel; a second joint portion that is formed on an end portion of the second panel, is offset toward the opposite side of the first joint portion with respect to the second panel body portion, and has a second joint surface that is joined by welding and adhesion to the first joint surface; and a pair of second load transfer portions that are formed via bent portions on an end portion of the second joint portion at a second panel body portion side and an end portion of the second joint portion at an opposite side of the second panel body portion side and have second load transfer surfaces that are bent with respect to the second joint surface and are contained in a range of a plate thickness of the second panel body portion, with the second load transfer surfaces being respectively joined by adhesion to the first load transfer surfaces In this way, in this panel joint structure, the first joint surface and the second joint surface are welded and adhered to each other, and the first load transfer surfaces and the second load transfer surfaces are respectively adhered to each other, whereby the first panel and the second panel are joined to each other.

Here, the first load transfer surfaces are respectively contained in the range of the plate thickness of the first panel body portion that configures the body portion of the first panel, and the second load transfer surfaces are respectively contained in the range of the plate thickness of the second panel body portion that configures the body portion of the second panel.

Consequently, even in a case where tensile forces have acted with respect to the first panel and the second panel parallel to these panels, the loads are transferred between the first load transfer surfaces and the second load transfer surfaces, whereby loads are transferred linearly between the first panel and the second panel. Because of this, moments can be suppressed from acting on the first joint portion and the second joint portion, so the loads can be suppressed from acting between the first joint portion and the second joint portion in the direction in which the first joint portion and the second joint portion come apart from each other. As a result, the first joint portion and the second joint portion can be suppressed from coming apart from each other.

In this panel joint structure, that the first load transfer surfaces are contained in the range of the plate thickness of the first panel body portion means that the first load transfer surfaces overlap, in the plate thickness direction of the first panel body portion, at least part of the first panel body portion in its plate thickness direction. Likewise, that the second load transfer surfaces are contained in the range of the plate thickness of the second panel body portion means that the second load transfer surfaces overlap, in the plate thickness direction of the second panel body portion, at least part of the second panel body portion in its plate thickness direction.

Here, in the panel joint structure of the present invention, it is more preferred that the centerlines that pass through plate thickness direction centers of the first panel body portion and the second panel body portion coincide with each other.

In this way, when the centerlines that pass through the plate thickness direction centers of the first panel body portion and the second panel body portion coincide with each other, the loads are transferred more linearly between the first panel and the second panel. Because of this, the moments can be suppressed even more effectively from acting on the first joint portion and the second joint portion.

Further, in the panel joint structure of the present invention, it is more preferred that the first load transfer surfaces and the second load transfer surfaces be inclined with respect to the first joint surface and the second joint surface, respectively.

In this way, if the first load transfer surfaces and the second load transfer surfaces are inclined with respect to the first joint surface and the second joint surface, respectively, the area of adhesion between the first load transfer surfaces and the second load transfer surfaces can be enlarged compared to a case where, for example, the first load transfer surfaces and the second load transfer surfaces are orthogonal to the first joint surface and the second joint surface, respectively. Because of this, the adhesive strength between the first load transfer surfaces and the second load transfer surfaces—and therefore the adhesive strength between the first panel and the second panel—can be raised.

Further, in the panel joint structure of the present invention, it is more preferred that the plate thicknesses of the first panel and the second panel be equal to each other.

In this way, if the plate thicknesses of the first panel and the second panel are equal to each other, in a case where the tensile forces have acted with respect to the first panel and the second panel parallel to these panels, the loads transferred between the first panel and the second panel can be distributed equally in the plate thickness direction of the panels. Because of this, the efficiency of the load transfer between the first panel and the second panel can be improved.

Advantageous Effects of Invention

As described in detail above, according to the present invention, even in a case where tensile forces have acted with respect to the first panel and the second panel parallel to these panels, the first joint portion and the second joint portion can be suppressed from coming apart from each other.

DESCRIPTION OF EMBODIMENT

An embodiment of the present invention will be described below with reference to the drawings.

Figure 1:
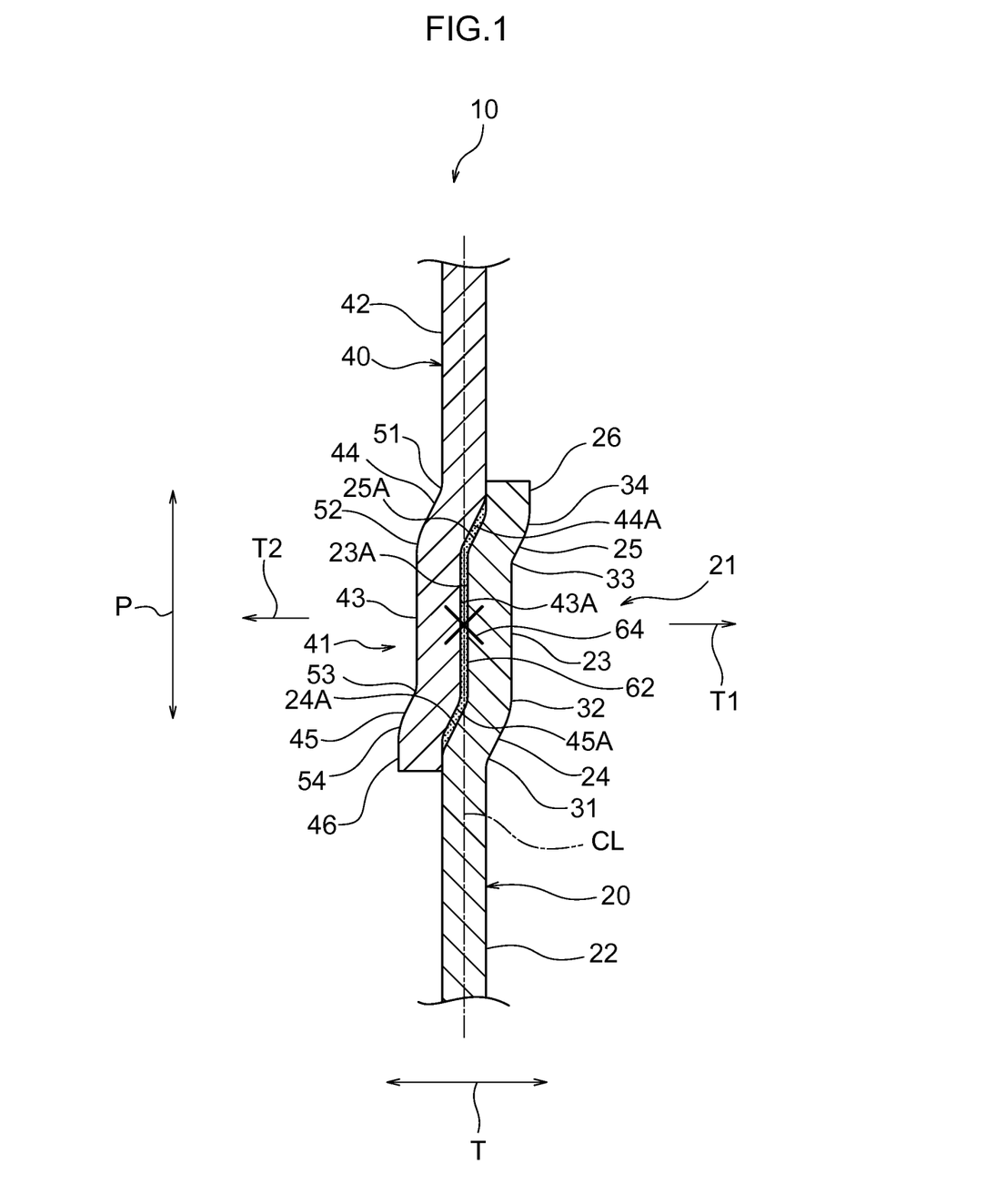
FIG. 1 is a side sectional view of a panel joint structure pertaining to an embodiment of the present invention.

As shown in FIG. 1, a panel joint structure 10 pertaining to the embodiment of the present invention has a first panel 20 and a second panel 40 that are each made of metal. The plate thicknesses of the first panel 20 and the second panel 40 are equal to each other, and the first panel 20 and the second panel 40 have the same configuration as each other. The first panel 20 and the second panel 40 are placed out of alignment with each other in a direction (the direction of arrow P) parallel to these panels. Additionally, respective end portions 21 and 41 of the first panel 20 and the second panel 40 are placed on top of each other.

Figure 2:
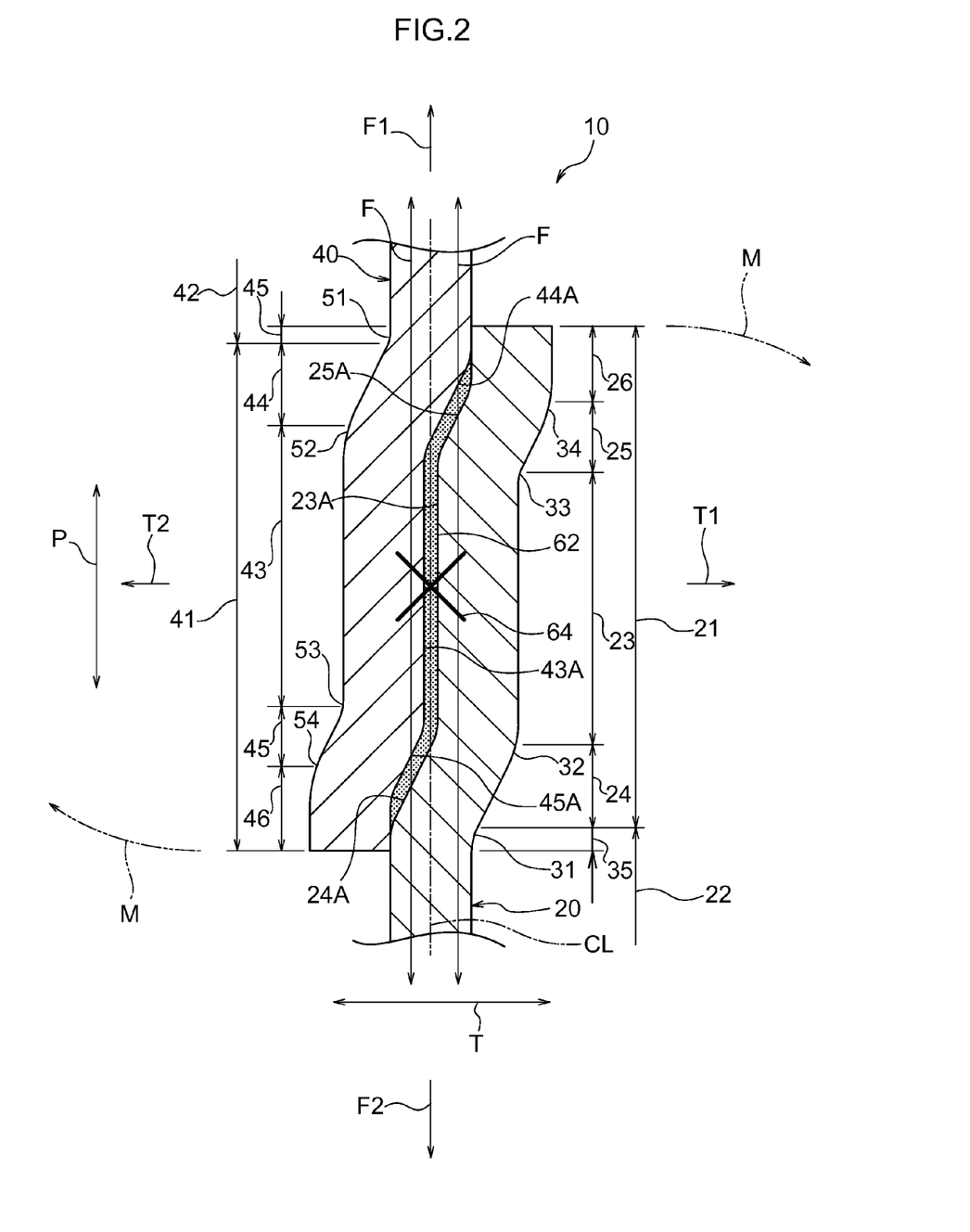
FIG. 2 is an enlarged view of main portions shown in FIG. 1.

As shown in FIG. 1 and FIG. 2, the section of the first panel 20 excluding the end portion 21 is a first panel body portion 22 that configures a body portion of the first panel 20. The first panel body portion 22 is formed in a flat plate shape. Further, a first joint portion 23, a pair of first load transfer portions 24 and 25, and a first distal end portion 26 are formed on the end portion 21 of the first panel 20.

The first joint portion 23 is offset toward one side (arrow T1 side) in a plate thickness direction of the first panel 20 with respect to the first panel body portion 22. The surface of the first joint portion 23 that is joined to the end portion 41 of the second panel 40 is a first joint surface 23A. The entire first joint portion 23 including the first joint surface 23A extends linearly along a centerline CL that passes through a plate thickness direction center of the first panel body portion 22.

The one first load transfer portion 24 is formed between the first joint portion 23 and the first panel body portion 22. The first load transfer portion 24 is formed via a bent portion 31 on the end portion of the first panel body portion 22 on the first joint portion 23 side and is formed via a bent portion 32 on the end portion of the first joint portion 23 on the first panel body portion 22 side. The first load transfer portion 24 is bent toward one side (arrow T1 side) in the plate thickness direction of the first panel 20 with respect to the first panel body portion 22. Further, in other words the first load transfer portion 24 is bent toward the other side (arrow T2 side) in the plate thickness direction of the first panel 20 with respect to the first joint portion 23.

The other first load transfer portion 25 is formed via a bent portion 33 on the end portion of the first joint portion 23 on the opposite side of the first panel body portion 22. The first load transfer portion 25 is bent toward one side (arrow T1 side) in the plate thickness direction of the first panel 20 with respect to the first joint portion 23.

Additionally, in this way the pair of first load transfer portions 24 and 25 are inclined with respect to the first joint portion 23 as a result of being bent with respect to the first joint portion 23. First load transfer surfaces 24A and 25A that are continuous with the first joint surface 23A are formed on the pair of the first load transfer portions 24 and 25, respectively. The first load transfer surfaces 24A and 25A are inclined with respect to the first joint surface 23A as an example of being bent with respect to the first joint surface 23A.

Further, the first load transfer surfaces 24A and 25A are contained in the range of the plate thickness of the first panel body portion 22. That is, the first load transfer surfaces 24A and 25A overlap, in the plate thickness direction (the direction of arrows T) of the first panel body portion 22, at least part of the first panel body portion 22 in its plate thickness direction.

The first distal end portion 26 is formed on the distal end of the end portion 21 of the first panel 20. The first distal end portion 26 is formed via a bent portion 34 on the end portion of the first load transfer portion 25 on the opposite side of the first joint portion 23 and extends linearly along the centerline CL of the first panel body portion 22.

The section of the second panel 40 excluding the end portion 41 is a second panel body portion 42 that configures a body portion of the second panel 40. The second panel body portion 42 is positioned on the opposite side of the first panel body portion 22 with respect to the end portion 21 of the first panel 20 and is formed in a flat plate shape extending along the centerline CL.

The centerline that passes through the plate thickness direction center of the second panel body portion 42 coincides with the centerline that passes through the plate thickness direction center of the first panel body portion 22. That is, the centerline CL is a centerline that passes through the plate thickness direction center of the first panel body portion 22 and is also a centerline that passes through the plate thickness direction center of the second panel body portion 42. Further, a second joint portion 43, a pair of second load transfer portions 44 and 45, and a second distal end portion 46 are formed on the end portion 41 of the second panel 40.

The second joint portion 43 is offset toward the opposite side (arrow T2 side) of the first joint portion 23 with respect to the second panel body portion 42. The surface of the second joint portion 43 that is joined to the second joint portion 23 is a second joint surface 43A. The entire second joint portion 43 including the second joint surface 43A extends linearly along the centerline CL of the second panel body portion 42.

The one second load transfer portion 44 is formed between the second joint portion 43 and the second panel body portion 42. The second load transfer portion 44 is formed via a bent portion 51 on the end portion of the second panel body portion 42 on the second joint portion 43 side and is formed via a bent portion 52 on the end portion of the second joint portion 43 on the second panel body 42 side. The second load transfer portion 44 is bent toward one side (arrow T1 side) in the plate thickness direction of the second panel 40 with respect to the second joint portion 43. Further, in other words, the second load transfer portion 44 is bent toward the other side (arrow T2 side) in the plate thickness direction of the second panel 40 with respect to the second panel body portion 42.

The other second load transfer portion 45 is formed via a bent portion 53 on the end portion of the second joint portion 43 on the opposite side of the second panel body portion 42. The second load transfer portion 45 is bent toward the other side (arrow T2 side) in the plate thickness direction of the second panel 40 with respect to the second joint portion 43.

Additionally, in this way the pair of second load transfer portions 44 and 45 are inclined with respect to the second joint portion 43 as a result of being bent with respect to the second joint portion 43. Second load transfer surfaces 44A and 45A that are continuous with the second joint surface 43A are formed on the pair of the second load transfer portions 44 and 45, respectively. The second load transfer surfaces 44A and 45A are inclined with respect to the second joint surface 43A as an example of being bent with respect to the second joint surface 43A.

Further, the second load transfer surfaces 44A and 45A are contained in the range of the plate thickness of the second panel body portion 42. That is, the second load transfer surfaces 44A and 45A overlap, in the plate thickness direction (the direction of arrows T) of the second panel body portion 42, at least part of the second panel body portion 42 in its plate thickness direction.

The second distal end portion 46 is formed on the distal end of the end portion 41 of the second panel 40. The second distal end portion 46 is formed via a bent portion 54 on the end portion of the second load transfer portion 45 on the opposite side of the second joint portion 43 and extends linearly along the centerline CL of the second panel body portion 42.

Additionally, the second distal end portion 46 is in contact with an end portion 35 of the first panel body portion 22 on the first load transfer portion 24 side. Likewise, the first distal end portion 26 is in contact with an end portion 45 of the second panel body portion 42 on the second load transfer portion 44 side.

Further, in a state in which the respective end portions 21 and 41 of the first panel 20 and second panel 40 are placed on top of each other in this way, the first joint surface 23A and the pair of first load transfer portions 24A and 25A oppose, via an interstice, the second joint surface 43A and the pair of second load transfer surfaces 44A and 45A, respectively. The interstice is filled with an adhesive 62.

Further, the first joint portion 23 and the second joint portion 43 are welded to each other at their center portions in a direction (the direction of arrow P) parallel to the first panel 20 and the second panel 40. Spot welding, for example, is used for the welding.

Additionally, the first joint surface 23A and the second joint surface 43A are joined to each other by a welded portion 64 resulting from the spot welding and the adhesive 62. The first load transfer surface 24A and the second load transfer surface 45A, and the first load transfer surface 25A and the second load transfer surface 45A, are joined to each other by the adhesive 62.

In the present embodiment, the first panel 20 and the second panel 40 are placed in such a way as to be point-symmetrical about the welded portion 64 resulting from the spot welding.

Next, the action and effects of the embodiment of the present invention will be described.

As described in detail above, in the panel joint structure 10 pertaining to the embodiment of the present invention, the first joint surface 23A and the second joint surface 43A are welded and adhered to each other, and the first load transfer surfaces 24A and 25A and the second load transfer surfaces 44A and 45A are adhered to each other, whereby the first panel 20 and the second panel 40 are joined to each other.

Here, the first load transfer surfaces 24A and 25A are contained in the range of the plate thickness of the first panel body portion 22 that configures the body portion of the first panel 20, and the second load transfer surfaces 44A and 45A are contained in the range of the plate thickness of the second panel body portion 42 that configures the body portion of the second panel 40.

Consequently, as shown in FIG. 2, even in a case where tensile forces F1 and F2 have acted with respect to the first panel 20 and the second panel 40 parallel to these panels, the loads are transferred between the first load transfer surfaces 24A and 25A and the second load transfer surfaces 44A and 45A, whereby loads F are linearly transferred between the first panel 20 and the second panel 40. Because of this, moments M can be suppressed from acting on the first joint portion 23 and the second joint portion 43, so the loads can be suppressed from acting between the first joint portion 23 and the second joint portion 43 in the direction in which the first joint portion 23 and the second joint portion 43 come apart from each other. As a result, the first joint portion 23 and the second joint portion 43 can be suppressed from coming apart from each other.

Further, the centerlines that pass through the plate thickness direction centers of the first panel body portion 22 and the second panel body portion 42 are the centerline CL and coincide with each other. Consequently, the loads F are transferred more linearly between the first panel 20 and the second panel 40. Because of this, the moments M can be suppressed even more effectively from acting on the first joint portion 23 and the second joint portion 43.

Further, the plate thicknesses of the first panel 20 and the second panel 40 are equal to each other, so in a case where the tensile forces F1 and F2 have acted with respect to the first panel 20 and the second panel 40, the loads F transferred between the first panel 20 and the second panel 40 can be distributed equally in the plate thickness direction (the direction of arrows T) of the panels. Because of this, the efficiency of the load transfer between the first panel 20 and the second panel 40 can be improved.

Further, the first load transfer surfaces 24A and 25A and the second load transfer surfaces 44A and 45A are inclined with respect to the first joint surface 23A and the second joint surface 43A, respectively, so the area of adhesion between the first load transfer surfaces 24A and 25A and the second load transfer surfaces 44A and 45A can be enlarged compared to a case where, for example, the first load transfer surfaces 24A and 25A and the second load transfer surfaces 44A and 45A are orthogonal to the first joint surface 23A and the second joint surface 43A, respectively. Because of this, the adhesive strength between the first load transfer surfaces 24A and 25A and the second load transfer surfaces 44A and 45A—and therefore the adhesive strength between the first panel 20 and the second panel 40—can be raised.

Next, modifications of the embodiment of the present invention will be described. In FIGS. 3-6, throughout the different modifications, like reference numerals from FIGS. 1-2, are used to designate like parts from FIGS. 1-2, thus, additional detailed descriptions are omitted.

In the above embodiment, the plate thicknesses of the first panel 20 and the second panel 40 were equal to each other. However, as shown in FIG. 3 and FIG. 4, the plate thicknesses of the first panel 20A, 20B and the second panel 40A, 40B of the panel joint structure 10A, 10B may also be different.

Figure 3:
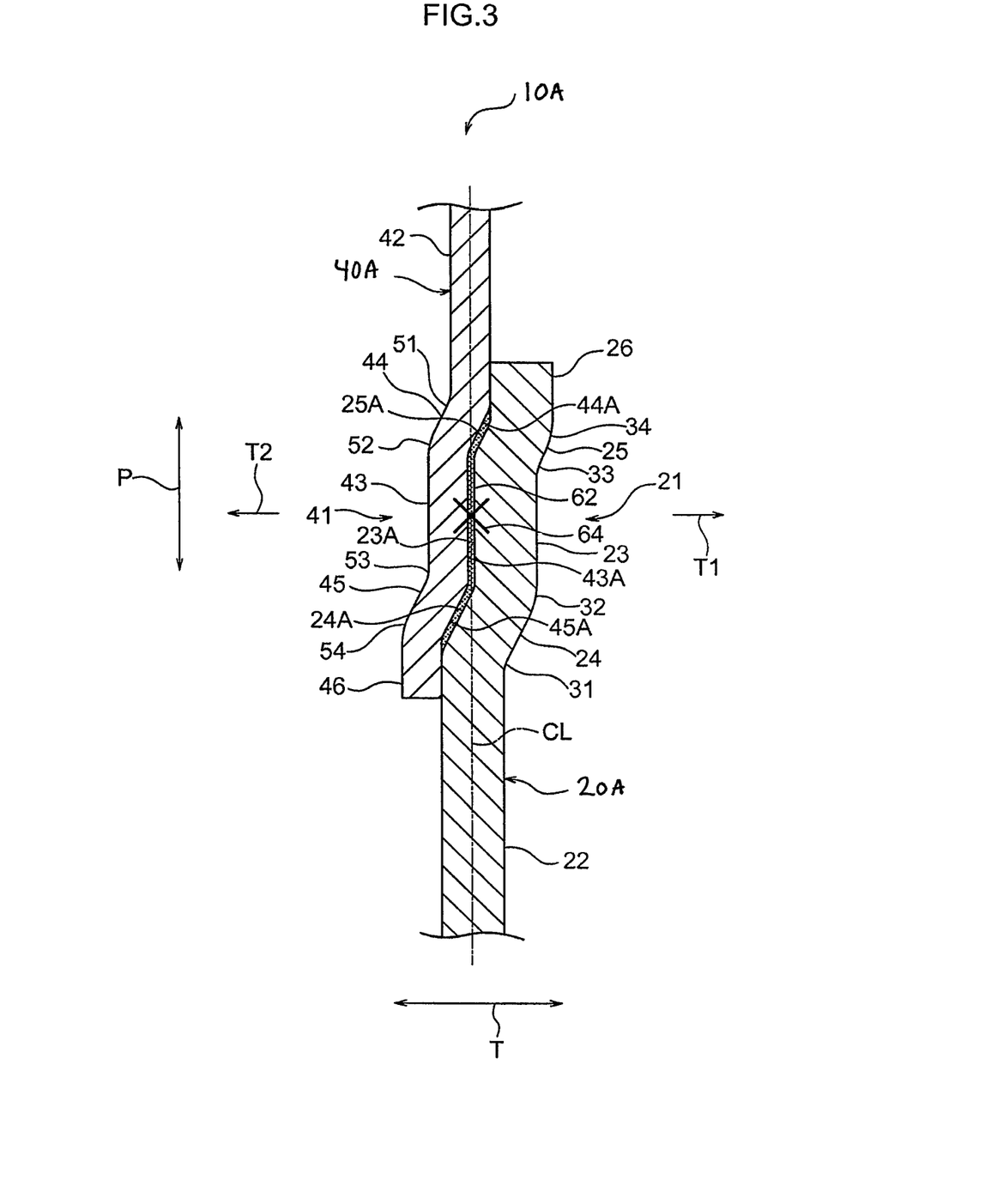
FIG. 3 is a side sectional view showing a first modification of the panel joint structure pertaining to the embodiment of the present invention.
Figure 4:
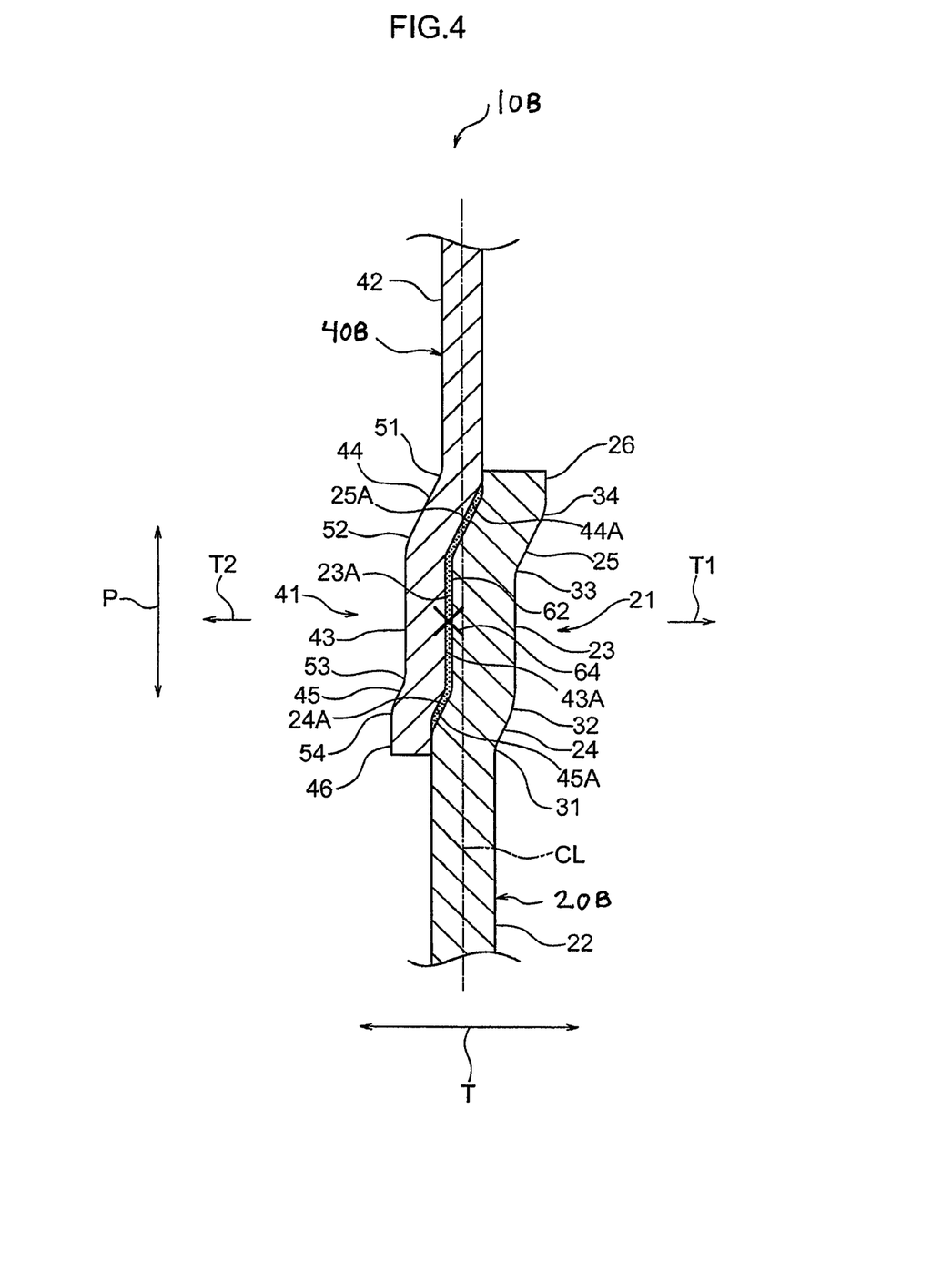
FIG. 4 is a side sectional view showing a second modification of the panel joint structure pertaining to the embodiment of the present invention.

Further, in this case, as shown in FIG. 3, the panel joint structure 10A may be configured in such a way that the centerline CL of the first panel body portion 22A and the second panel body portion 42A passes between the first joint surface 23A1 and the second joint surface 43A1. Further, as shown in FIG. 4, the panel joint structure 10B may be configured in such a way that the centerline CL passes through a position away from between the first joint surface 23A2 and the second joint surface 43A2.

Figure 5:
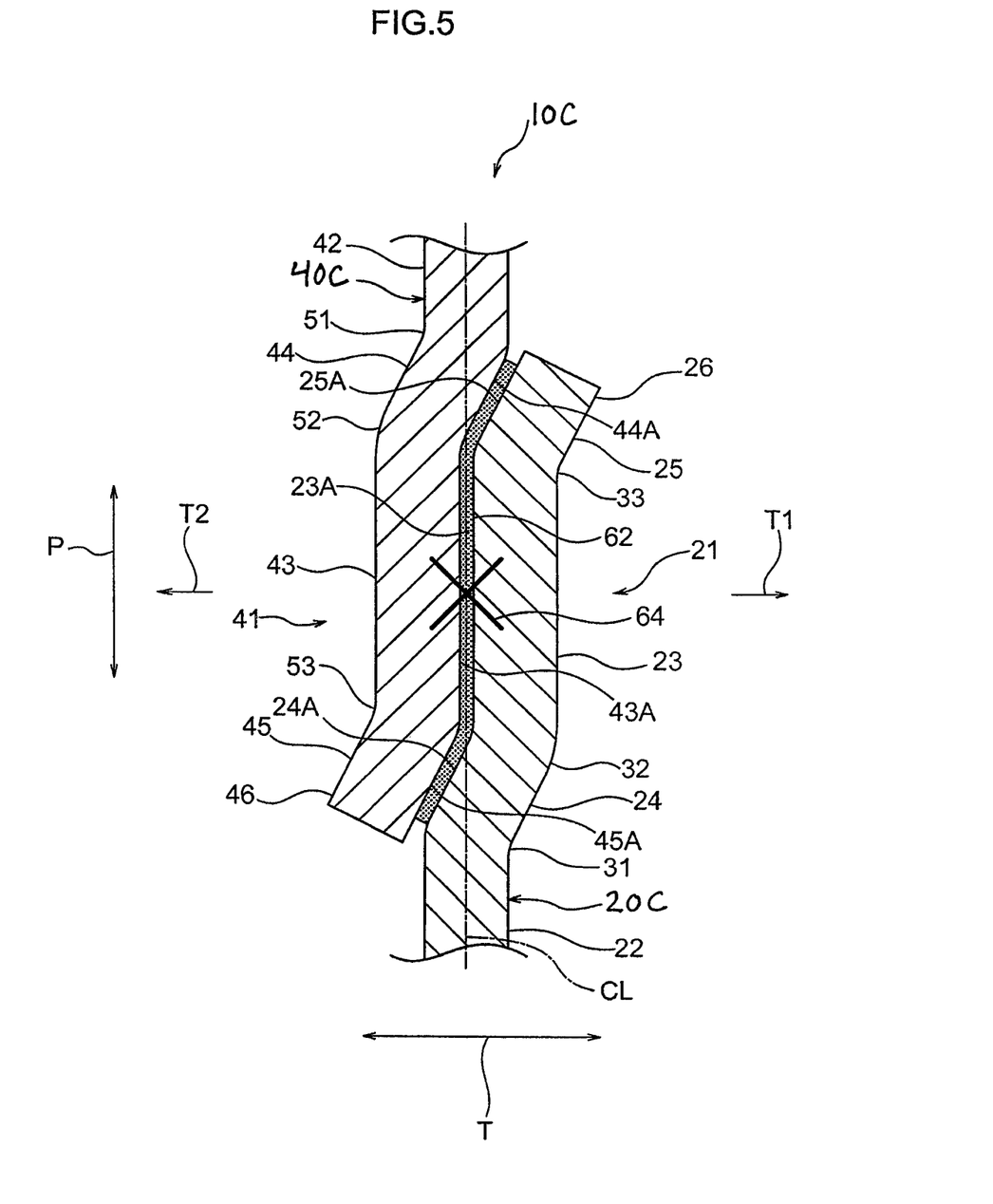
FIG. 5 is an enlarged side sectional view of main portions showing a third modification of the panel joint structure pertaining to the embodiment of the present invention.

Further, in the above embodiment, the first distal end portion 26B and the second distal end portion 46B were formed via the bent portions 34B and 54B on the first load transfer portion 25B and the second load transfer portion 45B, respectively. However, as shown in FIG. 5 (showing panel joint structure 10C, first panel 20C, and second panel 40C), the first distal end portion 26C and the second distal end portion 46C may also be formed extending from the first load transfer portion 25C and the second load transfer portion 45C, respectively. Additionally, the first distal end portion 26C and the second distal end portion 46C may also each have an interstice between themselves and the first panel body portion 22C and the second panel body portion 42C.

Figure 6:
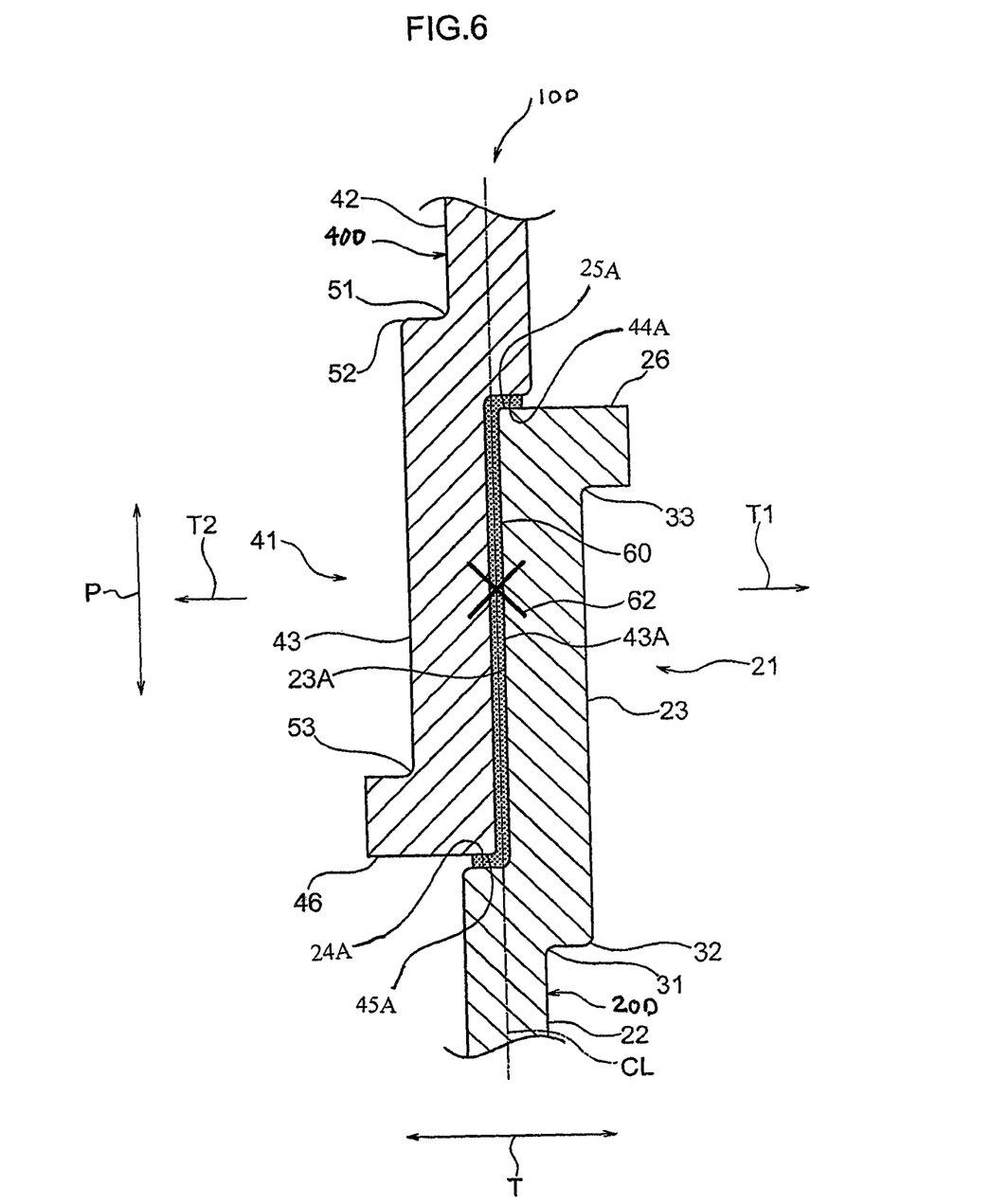
FIG. 6 is an enlarged side sectional view of main portions showing a fourth modification of the panel joint structure pertaining to the embodiment of the present invention.

Further, in the above embodiment, the first load transfer portions 24C and 25C and the second load transfer portions 44C and 45C were bent in such a way as to be inclined with respect to the first joint portion 23C and the second joint portion 43C. However, as shown in FIG. 6 (showing panel joint structure 10D, first panel 20D, and second panel 40D), the first load transfer portions 24D and 25D and the second load transfer portions 44D and 45D may also be bent in such a way as to form right angles with respect to the first joint portion 23D and the second joint portion 43D, respectively. Further, because of this, the first load transfer surfaces 24A4 and 25A4 may also form right angles with the first joint surface 23A4 as an example of being bent with respect to the first joint surface 23A4. Likewise, the second load transfer surfaces 44A4 and 45A4 may also form right angles with the second joint surface 43A4 as an example of being bent with respect to the second joint surface 43A4.

Further, in the above embodiment, the centerlines that pass through the plate thickness direction centers of the first panel body portion 22D and the second panel body portion 42D may also be a little out of alignment with each other provided that the first load transfer surfaces 24A4 and 25A4 are contained in the range of the plate thickness of the first panel body portion 22D and the second load transfer surfaces 44A4 and 45A4 are contained with the range of the plate thickness of the second panel body portion 42D.

An embodiment of the present invention has been described above, but the present invention is not limited to the above and is capable of being modified and implemented in a variety of ways without departing from the gist thereof.

The invention claimed is:

1. A panel joint structure comprising:
   a first panel body portion that configures a body portion of a first panel;
   a first joint portion that is formed on an end portion of the first panel, is offset toward one side of the first joint portion in a plate thickness direction of the first panel with respect to the first panel body portion, and has a first joint surface that extends parallel along a centerline that passes through a plate thickness direction center of the first panel body portion;
   a pair of first load transfer portions that are formed via bent portions on an end portion of the first joint portion at a first panel body portion side and an end portion of the first joint portion at an opposite side of the first panel body portion side and have first load transfer surfaces that are bent with respect to the first joint surface and are contained in a range of a plate thickness of the first panel body portion;
   a second panel body portion that is positioned on the opposite side of the first panel body portion side with respect to the end portion of the first panel, extends parallel along the centerline, and configures a body portion of a second panel;
   a second joint portion that is formed on an end portion of the second panel, is offset toward the opposite side of the first joint portion with respect to the second panel body portion, and has a second joint surface, that extends parallel along a centerline that passes through a plate thickness direction center of the second panel body portion, and that is joined by welding and adhesion to the first joint surface; and
   a pair of second load transfer portions that are formed via bent portions on an end portion of the second joint portion at a second panel body portion side and an end portion of the second joint portion at an opposite side of the second panel body portion side and have second load transfer surfaces that are bent with respect to the second joint surface and are contained in a range of a plate thickness of the second panel body portion, with the second load transfer surfaces being respectively joined by adhesion to the first load transfer surfaces;
   wherein the centerlines that pass through plate thickness direction centers of the first panel body portion and the second panel body portion coincide with each other.

2. The panel joint structure according to claim 1, wherein the first load transfer surfaces and the second load transfer surfaces are inclined with respect to the first joint surface and the second joint surface, respectively.

3. The panel joint structure according to claim 1, wherein the plate thicknesses of the first panel and the second panel are equal to each other.

* * * * *

UNITED STATES PATENT AND TRADEMARK OFFICE
CERTIFICATE OF CORRECTION

PATENT NO. : 8,979,416 B2
APPLICATION NO. : 13/814206
DATED : March 17, 2015
INVENTOR(S) : D. Itoh Page 1 of 5

It is certified that error appears in the above-identified patent and that said Letters Patent is hereby corrected as shown below:

In the Drawings

Please replace FIGS. 3-6 with FIGS. 3-6 as shown on the attached pages

In the Specification

At column 2, line 22, change "transfer surfaces" to -- transfer surfaces. --.

Signed and Sealed this
Fifth Day of January, 2016

Michelle K. Lee
*Director of the United States Patent and Trademark Office*